(12) United States Patent
Mente (10) Patent No.: US 8,303,680 B2
(45) Date of Patent: Nov. 6, 2012

(54) ENCAPSULATED PARTICLE

(75) Inventor: Donald C. Mente, Grosse Ile, MI (US)

(73) Assignee: BASF SE, Rheinland-Pfalz (DE)

( * ) Notice: Subject to any disclaimer, the term of this patent is extended or adjusted under 35 U.S.C. 154(b) by 311 days.

(21) Appl. No.: 12/490,771

(22) Filed: Jun. 24, 2009

(65) Prior Publication Data

US 2010/0326152 A1    Dec. 30, 2010

(51) Int. Cl.
| | |
|---|---|
| C05D 9/02 | (2006.01) |
| A01N 25/00 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |

(52) U.S. Cl. ............ 71/1; 71/64.07; 71/64.11; 428/407
(58) Field of Classification Search ................... 428/407; 71/64.07, 64.11; 524/722
See application file for complete search history.

(56) References Cited

U.S. PATENT DOCUMENTS

| | | | |
|---|---|---|---|
| 3,264,089 A | 8/1966 | Hansen | |
| 3,365,288 A | 1/1968 | Detmer et al. | |
| 3,475,154 A | 10/1969 | Kato | |
| 4,070,346 A | 1/1978 | Schnöring et al. | |
| 4,522,976 A | 6/1985 | Grace et al. | |
| 4,668,734 A * | 5/1987 | Dietrich et al. | 524/714 |
| 4,761,255 A | 8/1988 | Dahm et al. | |
| 5,093,412 A | 3/1992 | Mente et al. | |
| 5,125,952 A * | 6/1992 | Moore et al. | 71/28 |
| 5,137,563 A | 8/1992 | Valkanas | |
| 5,147,442 A | 9/1992 | Kosuge et al. | |
| 5,179,131 A | 1/1993 | Wujcik et al. | |
| 5,223,570 A | 6/1993 | Huang et al. | |
| 5,435,821 A | 7/1995 | Duvdevani et al. | |
| 5,594,066 A | 1/1997 | Heinemann et al. | |
| 5,652,196 A | 7/1997 | Luthra et al. | |

(Continued)

FOREIGN PATENT DOCUMENTS

EP    0 867 422 A2    9/1998

(Continued)

OTHER PUBLICATIONS

PCT International Search Report for PCT/EP2010/058934; dated Feb. 11, 2010; 3 pages.

*Primary Examiner* — Stanley Silverman
*Assistant Examiner* — Jennifer Smith
(74) *Attorney, Agent, or Firm* — Howard & Howard Attorneys PLLC (57) ABSTRACT

An encapsulated particle comprises a core particle and a polyurethane layer disposed about the core particle. The core particle can be various particles, such as fertilizer, biocides, flame retardants, seeds, etc. The polyurethane layer comprises the reaction product of an isocyanate component and an isocyanate-reactive component. The isocyanate-reactive component comprises a graft polyol having a continuous phase and polymeric particles. A method of forming the encapsulated particle comprises the steps of providing the core particle, applying the isocyanate and isocyanate-reactive components to the core particle, and reacting the isocyanate and isocyanate-reactive components to form the polyurethane layer. The encapsulated particle has excellent physical properties, such as increased water repellency, resiliency and shelf life.

26 Claims, 4 Drawing Sheets

U.S. PATENT DOCUMENTS

| | | |
|---|---|---|
| 5,814,699 A | 9/1998 | Kratz et al. |
| 6,034,146 A | 3/2000 | Falke et al. |
| 6,103,140 A | 8/2000 | Falke et al. |
| 6,322,606 B1 * | 11/2001 | Komoriya et al. ............ 71/11 |
| 6,352,658 B1 | 3/2002 | Chang et al. |
| 6,432,543 B2 | 8/2002 | Harrison et al. |
| 6,472,447 B1 | 10/2002 | Lorenz et al. |
| 6,500,223 B1 | 12/2002 | Sakai et al. |
| 6,649,107 B2 | 11/2003 | Harrison et al. |
| 7,179,882 B2 | 2/2007 | Adkins et al. |
| 7,416,785 B2 | 8/2008 | Mente |
| 2007/0191538 A1 | 8/2007 | Apichatachutapan et al. |

FOREIGN PATENT DOCUMENTS

WO 2005/118509 A1 12/2005

* cited by examiner

ENCAPSULATED PARTICLE

FIELD OF THE INVENTION

The present invention generally relates to an encapsulated particle, specifically to an encapsulated particle comprising a core particle and a polyurethane layer disposed about the core particle and comprising the reaction product of an isocyanate component and an isocyanate-reactive component comprising a graft polyol.

DESCRIPTION OF THE RELATED ART

Encapsulated particles, such as controlled-release fertilizers, are known in the agricultural art. Such encapsulated particles typically include one or more polyurethane layers disposed about a core particle, typically a fertilizer, such as urea. Thickness and integrity of the polyurethane layer limits dissolution rate of the encapsulated particles, specifically, a rate that the core particle degrades releasing itself, e.g. a "payload", into soil that includes moisture.

Unfortunately, many conventional encapsulated particles include inconsistent thickness of the polyurethane layer, which results in accelerated dissolution rates. As known in the agricultural art, such accelerated dissolution rates lead to waste and phytotoxicity, i.e., toxic effect of the fertilizer on plant growth. Further, many conventional encapsulated particles have polyurethane layers with integrity problems, since the polyurethane layers include defects, such as cracks, pits, depressions, etc. When a polyurethane layer including such defects is disposed about the core particle, the cracks, pits, and/or depressions allow water and other liquids to permeate the polyurethane layer, thus prematurely contacting and dissolving the core particle. To cure such defects, multiple polyurethane layers must typically be disposed about the core particle resulting in a time consuming and expensive manufacturing process for forming the encapsulated particles. Yet further, many conventional encapsulated particles are prone to breakage, due to the polyurethane layer lacking adequate hardness and resiliency. Such breakage reduces shelf life of the encapsulated particles, and results in waste during storage, handling, and use of the encapsulated particles.

Accordingly, there remains an opportunity to provide encapsulated particles with improved moisture resistance, improved swelling resistance, improved hydrophobicity, reduced manufacturing cost, and improved resiliency and toughness. There also remains an opportunity to provide encapsulated particles with extended and more predictable dissolution rates. There also remains an opportunity to provide a method of forming such encapsulated particles.

SUMMARY OF THE INVENTION AND ADVANTAGES

An encapsulated particle comprises a core particle and a polyurethane layer disposed about the core particle. The polyurethane layer comprises the reaction product of an isocyanate component and an isocyanate-reactive component. The isocyanate-reactive component comprises a graft polyol having a continuous phase and polymeric particles. A method of forming the encapsulated particle comprises the steps of providing the core particle, applying the isocyanate and isocyanate-reactive components to the core particle, and reacting the isocyanate and isocyanate-reactive components to form the polyurethane layer.

The present invention provides a unique combination of the isocyanate and isocyanate-reactive component. The graft polyol of the isocyanate-reactive component imparts the encapsulated particle with improved moisture resistance, improved swelling resistance, reduced manufacturing cost, and improved toughness. The polyurethane layer of the encapsulated particle provides for extended and more predictable dissolution rates of the encapsulated particle. The method of forming the encapsulated particle of the present invention generally results in a uniform, complete, and defect-free polyurethane layer disposed about the core particle. As such, a thinner and less expensive polyurethane layer disposed about the core particle can be employed. Furthermore, the encapsulated particle and the components thereof are shelf-stable thereby allowing for more effective storage and subsequent usage of the encapsulated particle and the components thereof.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
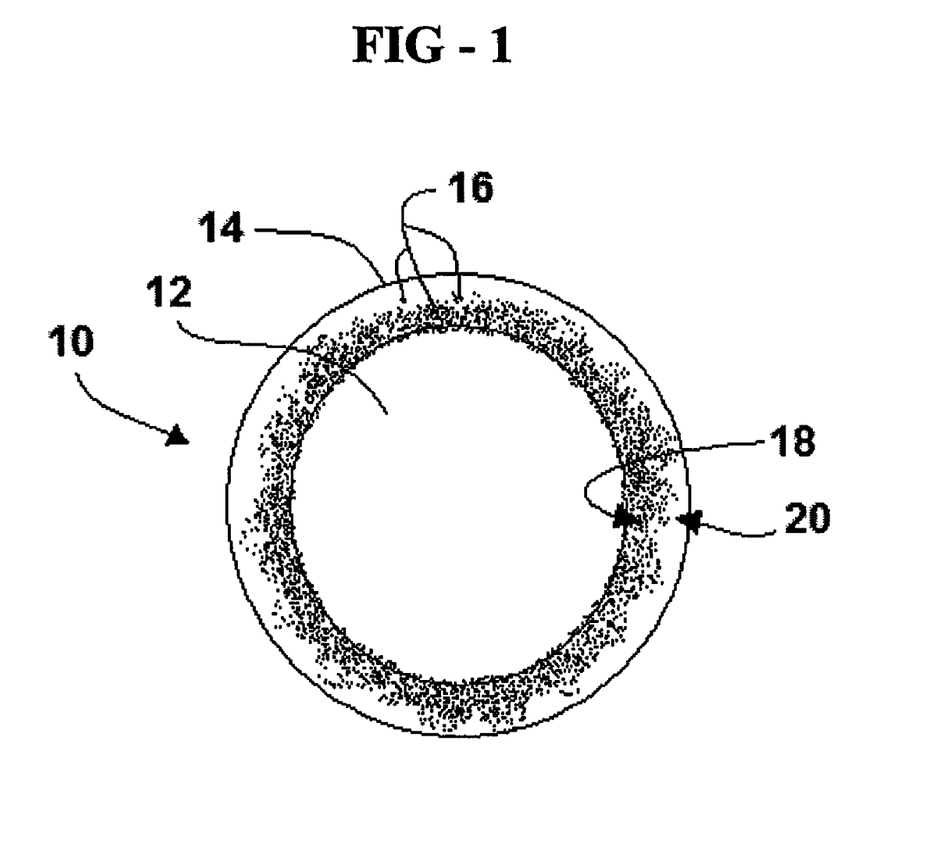
FIG. 1 is a cross-section of an encapsulated particle of the present invention.

Referring to the Figures, wherein like numerals indicate like parts throughout the several views, an encapsulated particle of the present invention is shown generally at 10. The encapsulated particle 10 comprises a core particle 12. In certain embodiments, the core particle 12 comprises a fertilizer. Typically, the fertilizer is selected from the group of nitrogen, phosphate, potash, sulfur, and combinations thereof. Suitable fertilizers, for purposes of the present invention, are commercial available from a variety of suppliers known to those of ordinary skill in the art.

In one embodiment, the fertilizer is nitrogen based. Examples of suitable fertilizers that are nitrogen based, for purposes of the present invention, include anhydrous ammonia, urea, ammonium nitrate, urea ammonium nitrate, calcium ammonium nitrate, and combinations thereof. In another embodiment, the fertilizer is phosphate based. Examples of suitable fertilizers that are phosphate based, for purposes of the present invention, include phosphoric acid, mono-ammonium phosphate, ammonium polyphosphate, ammonium phosphate sulfate, and combinations thereof. In yet another embodiment, the fertilizer is potash based. Examples of suitable fertilizers that are potash based, for purposes of the present invention, include potash, ammonium nitrate, and combinations thereof. In further embodiments, the fertilizer is sulfur based. Examples of suitable fertilizers that are sulfur based, for purposes of the present invention, include ammonium sulfate, sulfuric acid, and combinations thereof.

In other embodiments, the core particle 12 comprises a biocide. Examples of biocides, for purposes of the present invention, include herbicides, insecticides, fungicides, and combinations thereof. It is to be appreciated that alternative forms of core particles 12 can also be used, i.e., core particles 12 that are not fertilizers or biocides, such as flame retardants.

Other core particles 12, suitable for the purposes of the present invention, include but are not limited to bulbs and seeds, such as grass seeds, flower seeds, etc.

The core particle 12 is typically present in the encapsulated particle 10 in an amount of from about 75 to about 99, more typically from about 90 to about 99, and most typically from about 96 to about 98, parts by weight, based on 100 parts by weight of the encapsulated particle 10. It is to be appreciated that the encapsulated particle 10 can include any combination of two or more of the aforementioned core particles 12. In such embodiments, the core particle 12 can comprise, but is not limited to, a blend of core particle compositions, individual sub-particles of the core particle 12, and/or layers of different core particle compositions. For example, the core particle 12 can comprise an inner-core comprising urea with an outer-core disposed about the inner-core comprising sulfur. Typically, the core particle 12 is anhydrous, or at least anhydrous on its outermost surface (i.e., the core particle 12 is dry) to prevent premature reaction and/or degradation during manufacture and/or storage of the encapsulated particle 10.

The core particle 12 can be of various sizes and shapes. Typically, the core particle 12 is substantially spherical, having an average diameter of from about 0.1 to about 5, more typically from about 0.1 to about 2.5, and most typically from about 0.25 to about 1, millimeters (mm). It is to be appreciated that other sizes and/or shapes of core particles 12 can also be used, such as irregular, oblong or platelet shaped particles. In one embodiment, the core particles 12 are quite large. For example, the core particle 12 can take the form of a conventional tree spike shape, such that the encapsulated particle 10 is an encapsulated tree spike (not shown).

The encapsulated particle 10 further comprises a polyurethane layer 14 disposed about the core particle 12. For purposes of the present invention, it is to be understood that the terminology "disposed about" encompasses both partial and complete covering of the core particle 12 by the polyurethane layer 14. Typically, the core particle 12 is completely covered by the polyurethane layer 14, thereby protecting the core particle 12 from exposure to environmental conditions, such as from premature exposure to moisture. The polyurethane layer 14 typically has an average thickness that mimics thicknesses of conventional encapsulation layers, e.g. conventional fertilizer encapsulation layers, such as a thickness of from about 50 to about 200, more typically from about 100 to 150, most typically about 125 to about 150, microns. It is to be appreciated that the polyurethane layer 14 can be formed into various thicknesses depending on one or more desired properties, such as dissolution rates of the encapsulated particles 10.

The polyurethane layer 14 comprises the reaction product of an isocyanate component and an isocyanate-reactive component. The isocyanate component is typically a polyisocyanate having two or more isocyanate functional (NCO) groups. Suitable polyisocyanates, for purposes of the present invention include, but are not limited to, conventional aliphatic, cycloaliphatic, araliphatic and aromatic isocyanates. In certain embodiments, the isocyanate component is selected from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. Examples of other suitable isocyanates, for purposes of the present invention include, but are not limited to, toluene diisocyanates (TDIs), hexamethylene diisocyanates (HDIs), isophorone diisocyanates (IPDIs), naphthalene diisocyanates (NDIs), and combinations thereof.

In certain embodiments, the isocyanate component is an isocyanate-terminated prepolymer. The isocyanate-terminated prepolymer is a reaction product of an isocyanate and a polyol and/or a polyamine, as understood in the polyurethane art. The isocyanate may be any type of isocyanate known to those skilled in the polyurethane art, such as one of the polyisocyanates described above. If employed to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. If employed to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. It is to be appreciated that the isocyanate-terminated prepolymer may be formed from a combination of two or more of the aforementioned polyols and/or polyamines.

The isocyanate component may also be a modified isocyanate, such as, carbodiimides, allophanates, isocyanurates, and biurets. Other suitable isocyanates, for purposes of the present invention, include those described in U.S. Patent Publication No. 2005/0266245 to Mente et al., the disclosure of which is incorporated herein by reference in its entirety.

Specific examples of suitable isocyanate components, for purposes of the present invention, are commercially available from BASF Corporation of Florham Park, N.J., under the trademark LUPRANATE®, such as LUPRANATE® M, LUPRANATE® MI, LUPRANATE® M20, LUPRANATE® M20SB, LUPRANATE® M20HB, and LUPRANATE® M20FB isocyanates.

The polyurethane layer 14 is typically present in the encapsulated particle 10 in an amount of from about 25 to about 1, more typically from about 10 to about 1, and most typically from about 4 to about 2, parts by weight, based on 100 parts by weight of the encapsulated particle 10. Generally, the present invention provides for less material use, e.g. less isocyanate component use, relative to prior art encapsulated particles.

The isocyanate component typically has a viscosity which is suitable for specific applications of the isocyanate component to the core particle 12, such as by spraying, fogging, and/or atomizing the isocyanate component to apply the isocyanate component to the core particle 12. Typically, the isocyanate component has a viscosity of from about 10 to about 5,000, more typically from about 25 to about 2,500, and most typically from about 50 to about 200, cps at 25° C. according to ASTM D2196. Regardless of the application technique, the viscosity of the isocyanate component should be sufficient to adequately coat the core particle 12.

In certain embodiments, the isocyanate component has a nominal functionality of from about 1 to about 5, more typically from about 1.5 to about 4, and most typically from about 2.0 to about 2.7. In certain embodiments, the isocyanate component has an NCO content of from about 20 to about 50, more typically from about 25 to about 40, and most typically from about 30 to about 33, wt. % based on 100 parts by weight of the isocyanate component. The aforementioned NCO contents generally provide a high molecular crosslink density of the isocyanate component that aids in the formation of a defect free polyurethane layer 14, and also provide the isocyanate component with more chemical bonds per unit of mass to improve cost efficiency.

The isocyanate component is typically present in an amount of from about 1 to about 50, more typically from about 1 to about 25, yet more typically from about 1 to about 15, most typically from about 5 to about 10, and yet most typically about 7, parts by weight, based on 100 parts by weight of the reaction product. It is to be appreciated that the isocyanate component may include any combination of the aforementioned isocyanates and/or isocyanate-terminated prepolymers.

The isocyanate-reactive component comprises a graft polyol. In one embodiment, the graft polyol is a polymer polyol. In other embodiments, the graft polyol is selected from the group of polyharnstoff (PHD) polyols, polyisocyanate polyaddition (PIPA) polyols, and combinations thereof. It is to be appreciated that the isocyanate-reactive component can comprise any combination of the aforementioned graft polyols. In certain embodiments, the isocyanate-reactive component may also comprise other components including a supplemental polyol and/or other standard urethane resin components, as further described below. In another embodiment, the isocyanate-reactive component consists of the graft polyol.

Graft polyols may also be referred to in the art as graft dispersion polyols or graft polymer polyols. Graft polyols are well known to those skilled in the polyurethane art and include products, i.e., polymeric particles 16, obtained by the in-situ polymerization of one or more vinyl monomers, e.g. styrene monomers and/or acrylonitrile monomers, and a macromer in a polyol, e.g. a polyether polyol. In one embodiment, the isocyanate-reactive component is a styrene-acrylonitrile graft polyol. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanoamine instead of a diamine, to give a polyurethane dispersion in a polyol. It is to be appreciated that the present invention is not limited to any particular method of making the graft polyol.

The isocyanate-reactive component comprises a continuous phase. The continuous phase of the isocyanate-reactive component is not generally miscible with the isocyanate component, which provides for increased coverage of the polymeric particles 16 with reactive groups, such as hydroxyl functional (OH) groups. Such reactive groups can further impart crosslinking in the polyurethane layer 14, once the reactive groups are reacted. The polymeric particles 16 are further described below. In certain embodiments, as alluded to above, both the continuous phase and the polymeric particles 16 are reactive with the isocyanate component. These embodiments are described in greater detail below.

Typically, the continuous phase of the isocyanate-reactive component comprises a polyol. The polyol is generally the polyol employed for forming the graft polyol, as described and exemplified above. Such a polyol can be referred to in the art as a "carrier" polyol; however, a distinct polyol separate from the polymeric particles 16 may also be employed in addition to or alternate to the carrier polyol. The polyol generally has at least two hydroxyl functional (OH) groups reactive with the isocyanate component. The polyol may be the same as or different than the polyol previously described and exemplified above with description of the isocyanate-terminated prepolymer. The isocyanate-reactive component can comprise a polyester polyol, a polyether polyol, and combinations thereof. Further, the polyol can be selected from the group of, but is not limited to, aliphatic polyols, cycloaliphatic polyols, aromatic polyols, heterocyclic polyols, and combinations thereof. More specific examples of suitable polyols are selected from the group of, but are not limited to, glycerols, propylene glycols, sucrose-initiated polyols, sucrose/glycerine-initiated polyols, trimethylolpropane-initiated polyols, and combinations thereof. In certain embodiments, the polyol is (or is derived from) a "natural" oil, e.g. corn oil, cottonseed oil, castor oil, etc. Typically, in these embodiments, castor oil is used. In such embodiments, the continuous phase of the isocyanate-reactive component typically comprises castor oil. Castor oil is typically very hydrophobic and has a high hydroxyl number, which is useful for purposes of the present invention. Castor oil is also readily commercially available from a variety of suppliers. Employing natural oils, e.g. castor oil, provides an opportunity for natural and sustainable raw material use.

In certain embodiments, the polyol is a hydrophobic polyol. In a specific embodiment, the polyol is a hydrophobic polyether polyol. In another specific embodiment, the polyol is a hydrophobic polyester polyol. The hydrophobic polyol contains alkylene oxides. In these embodiments, the hydrophobic polyol typically has from about 0 to about 50, more typically from about 2 to about 20, and most typically from about 5 to about 15, parts by weight of ethylene oxide (EO), based on 100 parts by weight of the alkylene oxides of the hydrophobic polyol. In other embodiments, the hydrophobic polyol typically has at least 60, more typically at least 70, and most typically at least 80, parts by weight propylene oxide (PO), based on 100 parts by weight of the alkylene oxides. Accordingly, in these embodiments, the hydrophobic polyol is a propylene oxide rich polyol, which imparts the hydrophobic polyol with hydrophobicity, and therefore further imparts the polyurethane layer 14 of the encapsulated particle 10 with hydrophobicity.

In certain embodiments, the alkylene oxides of the hydrophobic polyol comprise a mixture of ethylene oxide and propylene oxide. In another embodiment, the alkylene oxides of the hydrophobic polyol include only propylene oxide, i.e., the hydrophobic polyol does not include other alkylene oxides, such as ethylene oxide. In certain embodiments, the hydrophobic polyol comprises other types of alkylene oxides known in the polyurethane art, e.g. butylene oxide (BO), in combination with propylene oxide, and optionally, in combination with ethylene oxide. The alkylene oxides of the hydrophobic polyol may be arranged in various configurations, such as a random (heteric) configuration, a block configuration, a capped configuration, or a combination thereof. For example, in one embodiment, the hydrophobic polyol comprises a heteric mixture of ethylene oxide and propylene oxide.

In certain embodiments, the hydrophobic polyol is terminally capped with ethylene oxide. The hydrophobic polyol typically has a terminal cap of from about 5 to about 25, more typically from about 5 to about 20, and most typically from about 10 to about 15, parts by weight ethylene oxide, based on 100 parts by weight of the hydrophobic polyol. It is to be appreciated that in certain embodiments, the ethylene oxide may only be present in the terminal ethylene oxide cap; however, in other embodiments, the ethylene oxide may also be present along with the propylene oxide, and optionally, with other alkylene oxides, e.g. butylene oxide, in the alkylene oxides of the hydrophobic polyol. Generally, for purposes of the present invention, increased propylene oxide content of the hydrophobic polyol is preferred in order to impart increased hydrophobicity to the polyurethane layer 14 of the encapsulated particle 10.

Suitable hydrophobic polyols, for purposes of the present invention include, but are not limited to, glycerine-initiated, trimethylolpropane-initiated, propylene glycol-initiated, and sucrose-initiated polyether polyols, and combinations thereof. In one embodiment, the hydrophobic polyol is a glycerine-initiated polyether polyol. In another embodiment, the hydrophobic polyol is a glycerine-initiated polyester polyol. The alkylene oxides of the hydrophobic polyol generally extend from the respective initiator portion of the hydrophobic polyol.

As introduced above, the isocyanate-reactive component comprises polymeric particles 16. Such polymeric particles 16 may be referred to in the art as a discontinuous phase of the isocyanate-reactive component. The polymeric particles 16 are generally large in size due to their macromer constituents, i.e., the polymeric particles 16 have micrometer or larger dimensions, such as micrometer or larger diameters. In certain embodiments, the polymeric particles 16 have average diameters ranging from about 0.1 to about 10 microns, more typically from about 0.1 to about 1.5 microns. In other embodiments, the polymeric particles 16 have average diameters less than 0.1 microns, which imparts the isocyanate-reactive component with nano-polymeric particles 16. It is to be appreciated that the polymeric particles 16 can include nano- and micro-size (or smaller and/or larger) particles.

As introduced above, the polymeric particles 16 typically comprise the reaction product of monomers selected from the group of styrenes, e.g. alpha-methyl styrene, acrylonitriles, esters of acrylic and methacrylic acids, ethylenically unsaturated nitriles, amines, amides, and combinations thereof. In certain embodiments, the polymeric particles 16 comprise the further reaction of a macromer, such as a polyol having an unsaturation, e.g. one of more olefinic groups, which permits chemical incorporation of the polymeric particle 16, as described above. In these embodiments, it is believed that the polymeric particles 16 can impart crosslinking in the polyurethane layer 14, due to reactive groups attached to the polymeric particles 16, e.g. OH groups imparted by the polyol, which can react with the isocyanate component.

In one embodiment, the polymeric particles 16 comprise styrene acrylonitrile (SAN) copolymers, which are the reaction product of styrene monomers and acrylonitrile monomers, as understood in the art. Typically, the SAN copolymers have a weight ratio of styrene to acrylonitrile of from about 30:70 to about 70:30, more typically about 40:60 to about 60:40, yet more typically from about 45:55 to about 60:40, most typically about 50:50 to about 60:40, and yet most typically from about 55:45 to about 60:40. In one embodiment, the SAN copolymers have a weight ratio of styrene to acrylonitrile of about 66.7:33.3. In another embodiment, the polymeric particles 16 are urea, which are the reaction product of an amine monomer and an isocyanate functional (NCO) group, such as an NCO group of a diisocyanate. In yet another embodiment, the polymeric particles 16 are urethane, which are the reaction product of an alcohol monomer and an NCO group, such as an NCO group of a diisocyanate.

Typically, the polymeric particles 16 are present in the isocyanate-reactive component in an amount of from about 5 to about 70, more typically from about 15 to about 55, and most typically from about 25 to about 50, parts by weight, based on 100 parts by weight of the isocyanate-reactive component. In one embodiment, the polymeric particles 16 are present in the isocyanate-reactive component in an amount of about 65 parts by weight based on 100 parts by weight of the isocyanate-reactive component. Generally, increasing the amount of polymeric particles 16 increases water repellency of the polyurethane layer 14 of the encapsulated particle 10. It is also believed that the polymeric particles 16 impart increased resiliency for the encapsulated particle 10 relative to prior art encapsulated particles.

The graft polyol typically has a molecular weight of from about 400 to about 20,000, more typically from about 500 to about 10,000, yet more typically from about 600 to about 5,000, and most typically from about 700 to about 3,000. In one embodiment, the graft polyol has a molecular weight of about 730. In another embodiment, the graft polyol has a molecular weight of about 3,000.

Other suitable graft polyols and methods of making the same, for purposes of the present invention, include those described in U.S. Pat. Nos. 4,522,976 to Grace et al.; 5,093,412 to Mente et al.; 5,179,131 to Wujcik et al.; 5,223,570 to Huang et al.; 5,594,066 to Heinemann et al.; 5,814,699 to Kratz et al.; 6,034,146 to Falke et al.; 6,103,140 to Falke et al.; 6,352,658 to Chang et al.; 6,432,543 to Harrison et al.; 6,472,447 to Lorenz et al.; 6,649,107 to Harrison et al.; and 7,179,882 to Adkins et al., the disclosures of which are incorporated herein by reference in their entirety.

Specific examples of suitable graft polyols, for purposes of the present invention, are commercially available from BASF Corporation of Florham Park, N.J., under the trademark PLURACOL®, such as PLURACOL® 1365, PLURACOL® 4600, PLURACOL® 4650, PLURACOL® 4800, PLURACOL® 4815, PLURACOL® 4830, and PLURACOL® 4850 graft polyols. It is to be appreciated that the isocyanate-reactive component can include any combination of two or more of the aforementioned graft polyols. Detailed information on graft polyols is described on pages 104 and 105 of THE POLYURETHANES HANDBOOK (David Randall & Steve Lee eds., John Wiley & Sons, Ltd. 2002), which are incorporated herein in their entirety. An example of a suitable method for making a graft polyol dispersion, for purposes of the present invention, is free radical polymerization reaction of acrylonitrile, styrene, and a polyether polyol macromer, each of the aforementioned components having at least one olefin group, the polyether polyol further including at least one hydroxyl group, and the reaction taking place in the presence of an initiator, e.g. a free radical polymerization initiator, and optionally, in the presence of additional polyol, which may be the same or different than the aforementioned polyether polyol.

The isocyanate-reactive component typically has a viscosity which is suitable for specific applications of the isocyanate-reactive component to the core particle 12, such as by spraying, fogging and/or atomizing the isocyanate-reactive component to apply the isocyanate-reactive component to the core particle 12. Typically, the isocyanate-reactive component has a viscosity of from about 100 to about 10,000, more typically from about 500 to about 5,000, and most typically from about 500 to about 3,000, cps at 25° C. according to ASTM D2196. Regardless of application technique, the viscosity of the isocyanate-reactive component should be sufficient to adequately coat the core particle 12.

Typically, the isocyanate-reactive component is present in an amount of from about 99 to about 50, more typically from about 99 to about 75, yet more typically from about 99 to about 85, most typically from about 95 to about 90, and yet most typically about 93, parts by weight, based on 100 parts by weight of the reaction product. It is to be appreciated that the isocyanate-reactive component may include any combination of the aforementioned polyols, polymeric particles, and/or graft polyols.

The isocyanate and isocyanate-reactive components can be present in the polyurethane layer 14 in various weight ratios. Generally, the graft polyol must be present in an effective amount to impart hydrophobicity to the polyurethane layer

14, as well as other physical properties described herein, such as resiliency for the encapsulated particle 10.

Typically, the isocyanate and isocyanate-reactive components are applied to the core particle 12 in a ratio of about 1.5 to 1, more typically about 1.25 to 1, and most typically about 1.1 to 1, based on the respective reactive sites of the isocyanate and isocyanate-reactive components as understood in the art. Such a ratio may be referred to in the polyurethane art as an isocyanate index, and is well understood by those of ordinary skill in the art.

As alluded to above, the reaction may further comprise an auxiliary polyol, different than the polyol employed as (or in) the isocyanate-reactive component. Suitable polyols for use as the auxiliary polyol are as described and exemplified above with description of the isocyanate-terminated prepolymer. The auxiliary polyol can be used for various purposes. For example, an auxiliary polyol having a higher functionality (relative to the polyol of the graft polyol) can be employed to provide additional reactive functional groups for reaction with the isocyanate component, or an auxiliary polyol can be employed to increase or decrease viscosity of the isocyanate-reactive component. If employed, the auxiliary polyol may be employed in various amounts.

The reaction product may further comprise the additive component. If employed, the additive component is typically selected from the group of parting agents, catalysts, fillers, plasticizers, stabilizers, cross-linking agents, chain-extending agents, chain-terminating agents, air releasing agents, wetting agents, surface modifiers, moisture scavengers, desiccants, viscosity reducers, reinforcing agents, colorants, anti-oxidants, compatibility agents, ultraviolet light stabilizers, thixotropic agents, anti-aging agents, lubricants, coupling agents, solvents, rheology promoters, thickeners, anti-static agents, and combinations thereof. If employed, the additive component may be present in various amounts. It is to be appreciated that the additive component may include any combination of the aforementioned additives, if employed.

In certain embodiments, the additive component comprises a catalyst component. In one embodiment, the catalyst component comprises a tin catalyst. Suitable tin catalysts, for purposes of the present invention, include tin(II) salts of organic carboxylic acids, e.g. tin(II) acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. of Allentown, Pa., under the trade name DABCO®. The organometallic catalyst can also comprise other dialkyltin (IV) salts of organic carboxylic acids, such as dibutyltin diacetate, dibutyltin maleate and dioctyltin diacetate.

Examples of other suitable catalysts, for purposes of the present invention, include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, for purposes of the present invention, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trade name POLYCAT®.

Yet further examples of other suitable catalysts, specifically tertiary amine catalysts, for purposes of the present invention, include dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propylamine), dimethylbenzylamine, trimethyl amine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N''-pentamethyldiethylenetriamine, 1,2-dimethylimidazole, 3-(dimethylamino) propylimidazole, and combinations thereof. Specific examples of suitable tertiary amine catalysts are commercially available from Air Products and Chemicals, Inc. under the trade name POLYCAT®.

If employed, the catalyst component can be employed in various amounts. It is to be appreciated that the catalyst component may include any combination of the aforementioned catalysts. In certain embodiments, the encapsulated particles 10 are formed in the absence of catalyst.

In certain embodiments, the additive component comprises a colorant, such as a dye and/or a pigment, for coloring the polyurethane layer 14. The colorant allows completeness of the polyurethane layer 14 to be visually evaluated and can provide various marketing advantages. If employed, the colorant can be employed in various amounts.

Typically, the polyurethane layer 14 is substantially free of water. By "substantially free", it is meant that in these embodiments, water is present in an amount no greater than about 5, more typically no greater than about 2.5, yet more typically no greater than about 1, and most typically approaching or equaling 0, parts by weight, based on 100 parts by weight of the polyurethane layer 14. Those of ordinary skill in the art appreciate that if the polyurethane layer 14 is completely free of water, the polyurethane layer 14 is anhydrous. It is generally preferred that the polyurethane layer 14 has little to no water to prevent the encapsulated particle 10 from prematurely degrading, such as by softening, rupturing, or sticking/agglomerating to other adjacent encapsulated particles 10 or surfaces. Such degradation can cause premature release of the core particle 14, and waste. Water can also be detrimental to the core particle 14 depending on the specific core particle 12 employed to form the encapsulated particle 10.

In certain embodiments, the polyurethane layer 14 is substantially free of a wax, such as paraffin. By "substantially free", it is meant that in these embodiments, wax is present in an amount no greater than about 5, more typically no greater than about 2.5, yet more typically no greater than about 1, and most typically approaching or equaling 0, parts by weight, based on 100 parts by weight of the polyurethane layer 14. Typically, the polyurethane layer 14 has little to no wax to allow for a uniform polyurethane layer 14, which can prevent water from permeating the polyurethane layer 14. However, wax can be employed in the polyurethane layer 14 if compatible with the specific components employed. Alternatively, or in addition, wax can be used as a supplemental coating layer disposed over the polyurethane layer 14 (not shown).

In certain embodiments, the polyurethane layer 14 includes a concentration of the isocyanate-reactive component proximal to the core particle 12 and a concentration of the isocyanate component distal to the core particle 12 and adjacent to the concentration of the isocyanate-reactive component. In other words, there is generally a concentration gradient in the polyurethane layer 14, with the concentration gradient having an innermost portion 18 comprising mostly the isocyanate-reactive component and an outermost portion 20 comprising mostly the isocyanate component. Such a concentration gradient can be appreciated with reference to FIG. 1. It is also to be appreciated that the encapsulated particle 10 and the concentration gradient are not drawn to scale in FIG. 1, as such what is depicted is merely for illustrative purposes. In these embodiments, the polyurethane layer 14 provides a substantially uniform covering for the core particle 12, with the concentration of the isocyanate component imparting a resilient coating for the encapsulated article 10, and the concentration of the isocyanate-reactive component imparting a uniform coating over the core particle 12 for the encapsulated particle 10. It is believed that the orientation of concentrations is beneficial, because the isocyanate-reactive component is (initially) "stickier" relative the isocyanate component, and therefore adheres to the core particle 12 better during manufacture, while the isocyanate component is free to subsequently react (after manufacture) with moisture in the atmosphere to impart a hard outer coating. Generally, this orientation also imparts the encapsulated particles 10 with excellent flow properties, i.e., they are free flowing, which can be useful during application of the encapsulated particles 10 to a substrate, e.g. to the ground. In other embodiments, the aforementioned concentrations are switched in orientation relative to the core particle 12, such that the concentration gradient is reversed (not shown). In yet other embodiments, the polyurethane layer 14 is substantially uniform, i.e., the polyurethane layer 14 does not generally include the concentration gradient (not shown). Methods of forming these specific polyurethane layers 14 are described further below.

The isocyanate component and the isocyanate-reactive component of the reaction product may be supplied to consumers for use by various means, such as in railcars, tankers, large sized drums and containers or smaller sized drums, totes, and kits. For example, one drum can contain the isocyanate component and another drum can contain the isocyanate-reactive component. Providing the components to consumers separately reduces premature reaction of the components and provides for increased formulation flexibility for forming the reaction product and therefore the encapsulated particle 10. For example, a consumer can select a specific isocyanate component and a specific isocyanate-reactive component, and amounts thereof, to prepare the polyurethane layer 14 therefrom. Various types of core particles 12 can also be employed. If other components are employed, such as the auxiliary polyol and/or the additive component, e.g. the colorant, such components can be provided separately or premixed with one of or both of the isocyanate component and the isocyanate-reactive component.

To form the encapsulated particle 10, the core particle 12 is provided. The isocyanate component and the isocyanate-reactive component are then applied to the core particle 12. Upon contact (and while under reaction conditions understood in the polyurethane art), the isocyanate component and the isocyanate-reactive component begin to react to form the polyurethane layer 14 disposed about the core particle 12 to form the encapsulated particle 10.

In one embodiment, the isocyanate-reactive component is applied to the core particle 12 prior to applying the isocyanate component to the core particle 12. As introduced above, and as illustrated in FIG. 1, this embodiment is useful for forming the concentration gradient having the concentration of the isocyanate-reactive component proximal, e.g. disposed about, the core particle 12 to form an isocyanate-reactive layer with the isocyanate component disposed about and reacting with the isocyanate-reactive layer. In another embodiment, the isocyanate component is applied to the core particle 12 prior to applying the isocyanate-reactive component to the core particle 12. As introduced above, this embodiment is useful for forming the concentration gradient having the concentration of the isocyanate component proximal, e.g. disposed about, the core particle 12 to form an isocyanate layer with the isocyanate-reactive component disposed about and reacting with the isocyanate layer.

In one embodiment, the isocyanate component and the isocyanate-reactive component are pre-blended to form a mixture. The mixture is then applied to the core particle 12 to form the encapsulated particle 10. As introduced above, this embodiment is useful for forming a uniform polyurethane layer 14, i.e., the polyurethane layer 14 is substantially free of the concentration gradients as described in the embodiments above, and instead, has a uniform dispersion of the polymeric particles 16 disposed throughout the polyurethane layer 14.

The components can be applied by various methods known in the art. Examples of suitable methods of encapsulation, for purposes of the present invention, include bulk coating, tumbling, sheet coating, pan coating, fluidized-bed coating, co-extrusion, spraying and spinning disk encapsulation. Such methods and other encapsulation methods are well known to those of ordinary skill in the polyurethane and chemical engineering art. In certain embodiments, the components are sprayed, atomized, and/or fogged onto the core particle 12, typically core particles 12, while the core particles 12 are being agitated in suitable equipment. Typically, spraying, atomizing, and/or fogging the components onto the core particle 12 results in a uniform, complete, and defect-free polyurethane layer 14 disposed about the core particle 12. Spraying, atomizing, and/or fogging the components also results in a thinner and less expensive polyurethane layer 14 disposed about the core particle 12. However, several application steps can be used to build-up the thickness of the polyurethane layer 14, if so desired. Spraying, atomizing and fogging of the components can occur via use of nozzles, such as one nozzle for each component supplied thereto, or nozzles that have two or more components premixed and supplied thereto. Generally, at least one nozzle applies the isocyanate component, and at least one nozzle applies the isocyanate-reactive component, to the core particle 12. As described and exemplified above, various orders of application can be employed to form the polyurethane layer 14.

To maximize coverage of the core particles 12, the components are generally applied by spraying droplets or atomizing or fogging particles of the components onto the core particles 12 as the core particles 12 are being tumbled in a rotary blender or similar apparatus. As another example, the core particles 12 can be coated with the components in a rotary drum blender equipped with at least one, typically at least two spinning disk atomizers. Tumblers, drums, or rollers including baffles can also be used, as understood in the art. Alternatively, the core particles 12 can be provided directly to a carrier, e.g. a screened conveyor belt and the components can be applied to the core particles 12, e.g. by spraying or sheeting, to form the encapsulated particles 10. Further, at least one of the components, e.g. the isocyanate-reactive component, can already be present on the core particles 12, such that the remaining component(s) of the reaction product, e.g. the isocyanate component, can then be applied to the core particles 12 and to the isocyanate-reactive component to form the polyurethane layer 14. Prior to the polyurethane layer 14 fully curing, the encapsulated particles 10 are typically kept moving to avoid agglomeration.

The amount of the components to be applied and mixed with the core particles 12 is dependant upon several variables including the specific components employed, the size and type of core particle 12 used, the intended use of the encapsulated particle 10, desired thickness of the polyurethane layer 14, and the desired properties of the encapsulated particle 10.

The encapsulated particles 10 can be of various sizes and shapes. Typically, the encapsulated particles 10 are substantially spherical, having an average diameter of from about 0.5 to about 7.5, more typically from about 0.5 to about 3, and most typically from about 1 to about 2, millimeters (mm); however, the encapsulated particles 10 can be of other shapes, such as irregular, pocked, oblong or platelet shaped encapsulated particles 10.

Without being bound or limited by any particular theory, it is believed that the isocyanate-reactive imparts a certain degree of water repellency to the encapsulated particle 10. Specifically, it is believed that the graft polyol of the polyurethane layer 14 imparts such water repellency. One method by which the isocyanate-reactive component of the present invention imparts water repellency is by at least partially coating a surface of the core particle 12, thus decreasing surface tension of the surface. Another method by which the isocyanate-reactive component imparts water repellency is that the isocyanate-reactive component at least partially fills capillaries within the core particle 12 and/or polyurethane layer 14 thus providing a barrier to capillary uptake of water. Further, it is believed that the isocyanate-reactive component reduces formation of micro- and/or nano-cracks from forming within the polyurethane layer 14, during or after cure to form the encapsulated particle 10. Yet further, if such cracks are already present in the core particle 12, the isocyanate-reactive component at least partially fills such cracks, as alluded to above with description of the capillaries. It is believed that the blocking of water and filling of cracks reduces degradation problems such as swelling and agglomeration when the encapsulated particle 10 is exposed to atmospheric moisture during storage and handling. This increases shelf life of the encapsulated particle 10, and increasing robustness and resiliency of the encapsulated particle 10 during transport (e.g. shipping) and handling. Such blocking and filling also better controls dissolution of the encapsulated particle 10, as described further below. It is further believed that such "filling" largely occurs due to the polymeric particles 16 of the graft polyol. Specifically, it is believed that the polymeric particles 16 of the isocyanate-reactive component at least partially fill these cracks, if present. In addition to filling cracks, in certain embodiments, the polymeric particles 16 are reactive with the isocyanate component, which can increase strength and toughness of the polyurethane layer 14. Other benefits imparted by the graft polyol are described further below.

The encapsulated particles 10 can be supplied to consumers in the same manner as the components employed to form them, as described and exemplified above for the isocyanate and isocyanate-reactive components. Typically, the encapsulated particles 10 are supplied in bags, such as paper and/or plastic bags containing about one (1) to about eighty (80) pounds of the encapsulated particles 10 for ease of handling and use. It is to be appreciated that such bags can include other nutrients and/or fillers in addition to the encapsulated particles 10, such as those typically included along with conventional fertilizers. In certain embodiment, the bags can include both encapsulated and non-encapsulated particles. It is also to be appreciated that the bags can included different grades of encapsulated particles 10, such as ones having different dissolution rates, which can be imparted by different polyurethane layer 14 thicknesses.

It is to be appreciated that various types of the encapsulated particles 10 can be supplied to consumers in blends, such as encapsulated particles 10 having different core particles 12, e.g. different types of fertilizers, such as nitrogen and potash, nitrogen and sulfur, etc. The encapsulated particles 10 can also be of different physical properties, such as different sizes and shapes, different dissolution rates, different hardness, etc. Such properties are described below. Generally, the encapsulated particles 10 do not agglomerate, such that the encapsulated particles 10 are pourable for ease of use, i.e., are free flowing, and thereby do not clog apparatuses used to supplying and/or spreading of the encapsulated particles 10, such as by use of a fertilizer spreader.

The encapsulated particles 10 can be of various hardness (or "crush" strength) depending on several variables including, the specific components and amounts thereof employed, size and shape of the core particle 12, size and shape of the encapsulated particle 10, and thickness of the polyurethane layer 14. Typically, the encapsulated particle 10 has an excellent hardness relative to prior art encapsulated particles. Hardness of the encapsulated particles 10 provides for longer life of the encapsulated particles 10, such that the encapsulated particles 10 have excellent handling and storage/shelf life. Specifically, the polyurethane layer 14 of the present invention provides for increased resiliency of the encapsulated particle 10, relative to conventional encapsulated particles. It is believed that the polymeric particles 16 of the polyurethane layer 14 provide for such resiliency, by serving as a cushion/impact absorbers for the encapsulated particle 10. Typically, the encapsulated particles 10 have a shelf life of at least about 1, more typically at least about 5, and most typically at least about 10, months. It is to be appreciated that the encapsulated particles 10 can have a near infinite shelf life, more typically 20 or more years, based in part upon exposure (or lack thereof) to moisture.

The encapsulated particle 10 of the present invention is also useful for providing the core particle 12, e.g. fertilizer, in a time-released manner. Time release, i.e., time required for the polyurethane layer 14 to be perforated such that the core particle 12 can be released to the surrounding environment, depends on several variables including, the specific components and amounts thereof employed, size and shape of the core particle 12, size and shape of the encapsulated particle 10, and thickness of the polyurethane layer 14. Such a determination can be easily tested by placing the encapsulated particles 10 in a beaker full of water, such that the encapsulated particles 10 are completely covered by the water. Perforations of the polyurethane layer 14 can be evaluated upon visual inspection of the encapsulated particles 10, and/or by observing changes in clarity of the water. Perforations can range from pin-holing in or sloughing off of the polyurethane layer 14. It is to be appreciated that time release only applies if the polyurethane layer 14 fully envelops the core particle 12; otherwise, the core particle 12 is already at least partially exposed to the surrounding environment.

Figure 2:
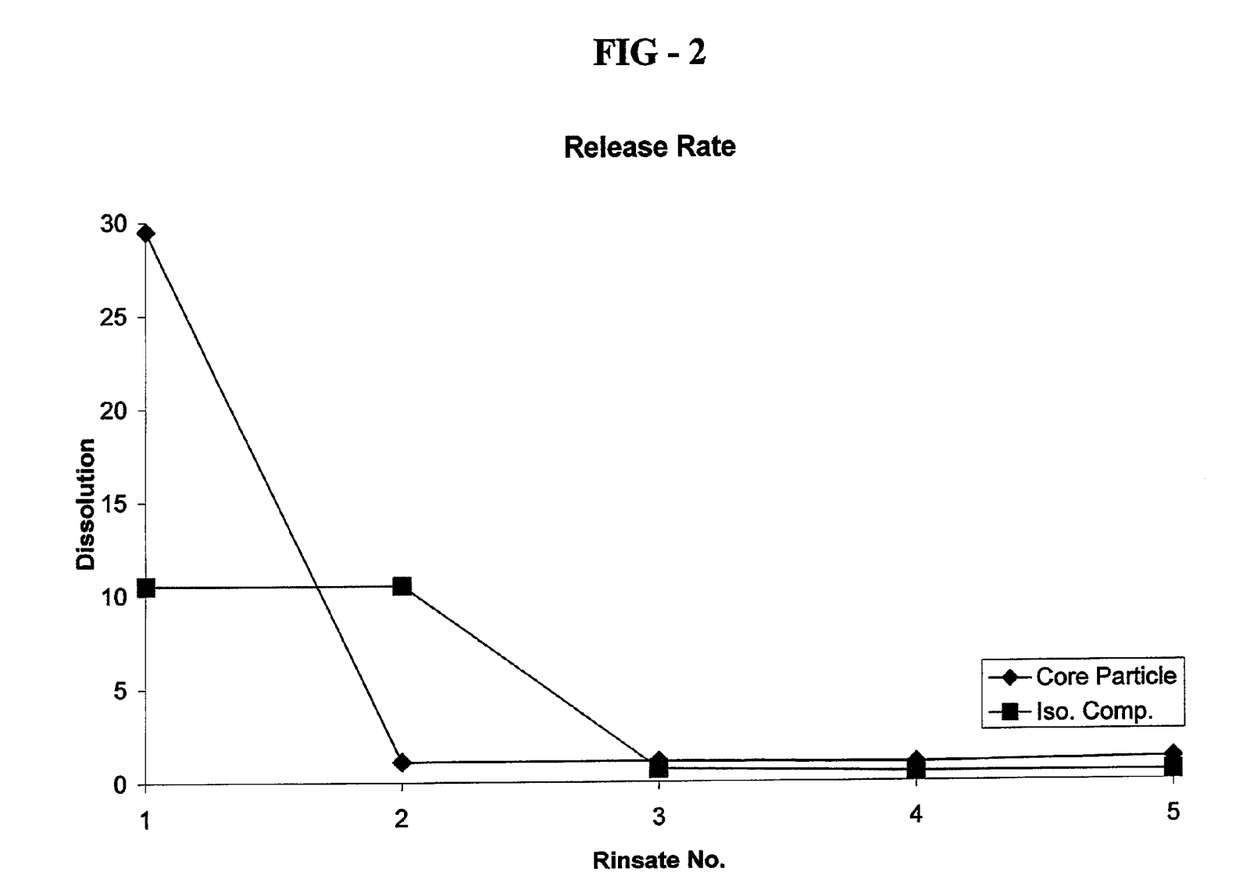
FIG. 2 is a chart illustrating dissolution rates of comparative examples.
Figure 3:
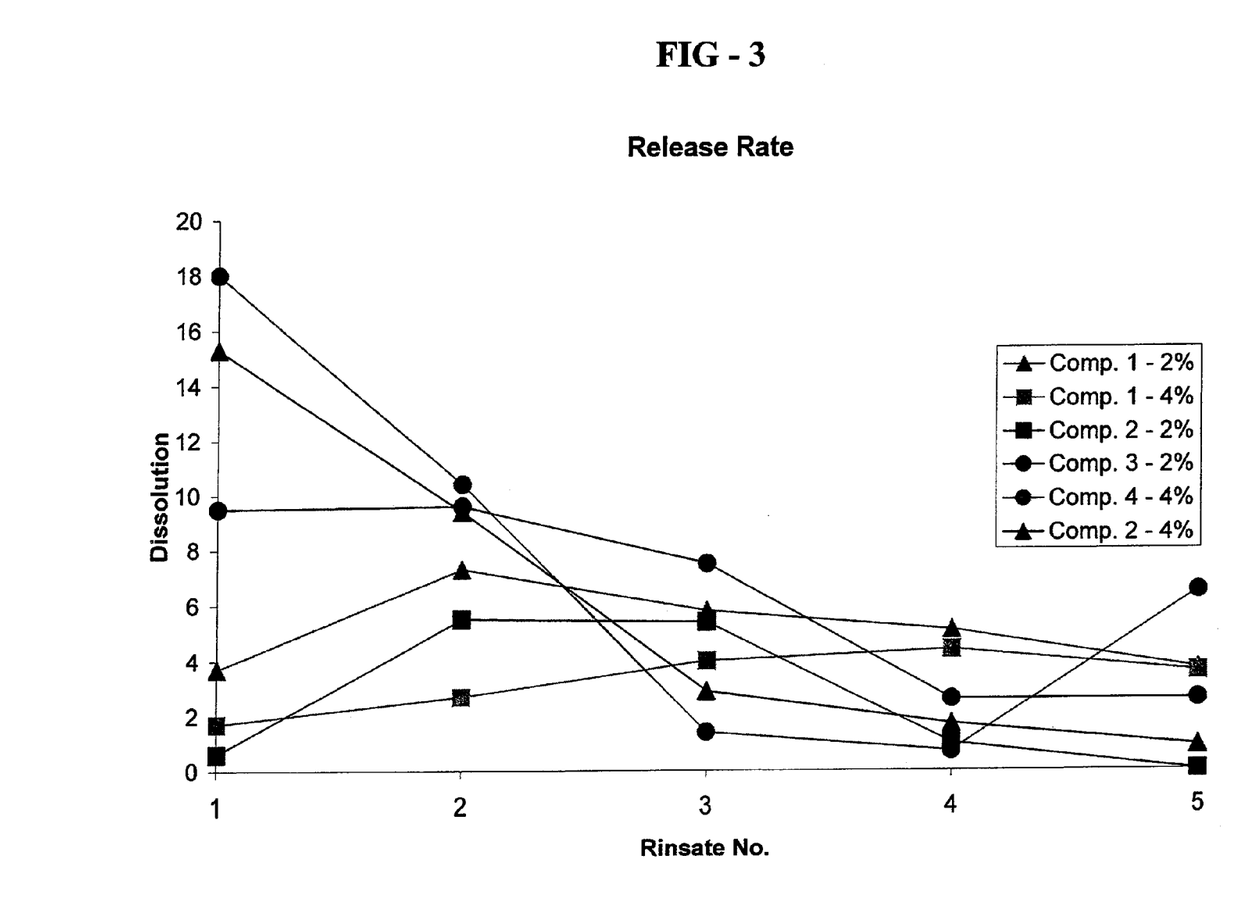
FIG. 3 is another chart illustrating dissolution rates of comparative examples.
Figure 4:
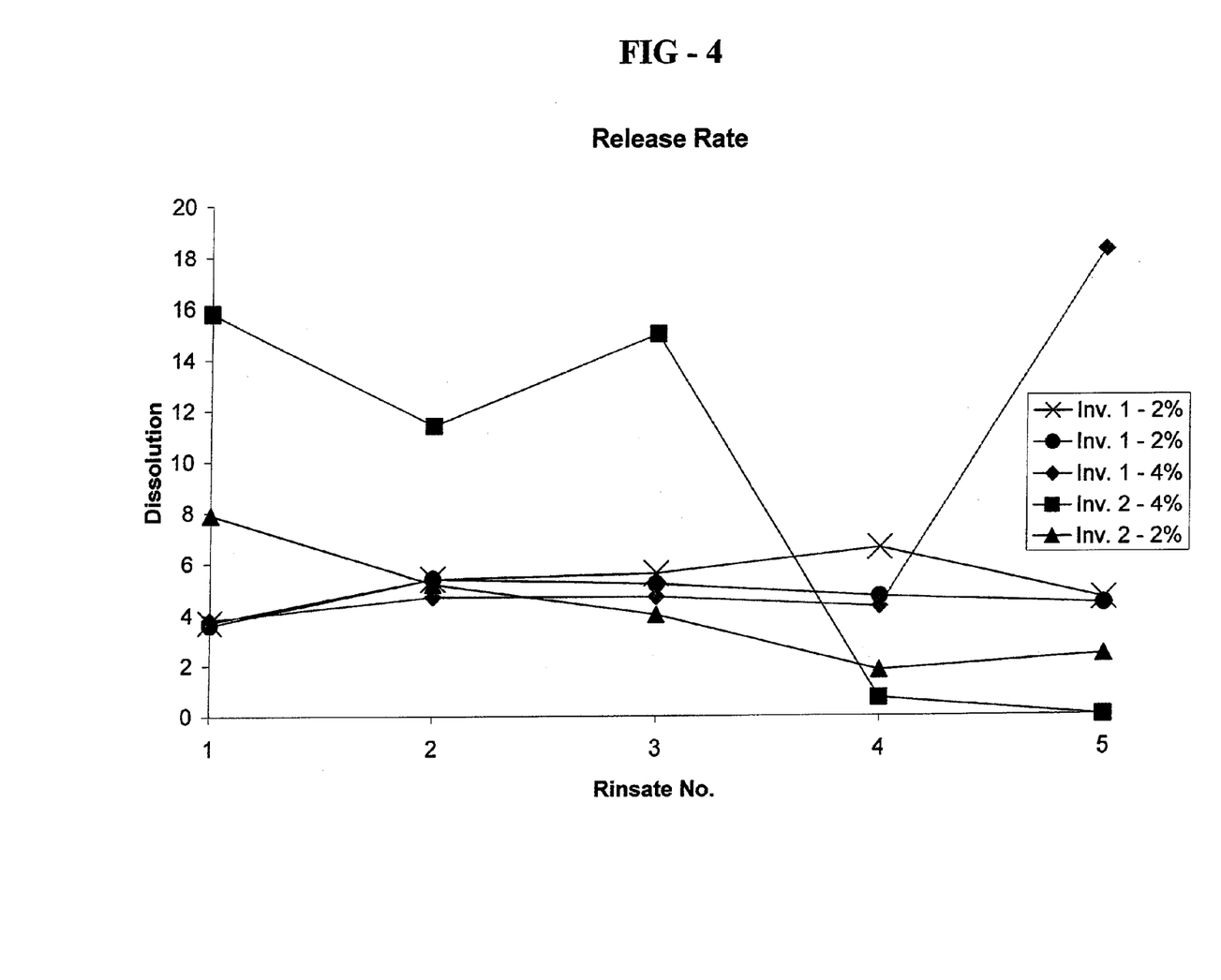
FIG. 4 is a chart illustrating dissolution rates of inventive examples of the present invention.

Time release of the encapsulated particle 10 is also associated with dissolution rate of the encapsulated particle 10, as introduced above. As understood in the art, dissolution rate is a measurement of how much of the core particle 12 is dispersed into the surrounding environment. For example, the amount of fertilizer released to the surrounding soil over time once the encapsulated particle 10 is exposed to moisture, e.g. from rain or irrigation. The encapsulated particles 10 have excellent dissolution rates relative to prior art encapsulated particles, which can be appreciated with reference to FIGS. 2, 3 and 4, and the EXAMPLES section below. Generally, the encapsulated particles 10 of the present invention have a uniform dissolution rate, i.e., a near steady-state release of the core particle 12 over a period of time. Alternatively, or in addition to, the encapsulated particles 10 of the present invention have a time-delayed release, e.g. the core particle 12 will begin to dissolve and therefore release some period of time after the encapsulated particles 10 are first exposed to a sufficient amount of moisture to permeate the polyurethane layer 14.

One way in which such dissolution works is by the polyurethane layer 14 becoming permeated such that that water can enter into the encapsulated particle 10. After entry of water, the water can interact with the core particle 12, e.g. fertilizer. For example, if the core particle 12 comprises a nitrogen based fertilizer, after water migrates through the polyurethane layer 14, the nitrogen based fertilizer dissolves into solution inside the encapsulated particle 10, and the solution then migrates out through the polyurethane layer 14 into surrounding soil to deliver the nitrogen. When the core particle 12 is a fertilizer, water and/or other liquids generally cannot permeate the polyurethane layer 14 too quickly, thus preventing the water and/or other liquids from rapidly dissolving the core particle 12, thus preventing phytotoxicity, and providing for more predictable and controlled dissolution rates.

The following examples, illustrating the encapsulated particles of the present invention, are intended to illustrate and not to limit the present invention.

EXAMPLES

Encapsulated particles are prepared in beakers. First, an isocyanate-reactive component, specifically a polyol, is heated and added drop-wise to a beaker containing core particles, specifically urea spheres (i.e., fertilizer), to form a polyol-urea mixture. The polyol-urea mixture is swirled gently using a foam mix blade to ensure distribution of the polyol around the urea spheres. Next, an isocyanate component is heated and added to the polyol-urea mixture and manually swirled to ensure complete contact between the urea spheres and the reaction product of the polyol and the isocyanate component. Complete contact results in a polyurethane layer disposed about the urea spheres. The urea spheres coated by the reaction product are subsequently stirred with a foam mix blade to minimize agglomeration resulting in a free flowing group of encapsulated particles, i.e., encapsulated urea spheres.

Overall, the polyurethane layers are applied at 2 wt % and 4 wt % based on total urea weight to measure differences imparted by varying thicknesses. Such differences are indicated in tables 1-3 below. All of the polyurethane layers (or coatings) are applied at a 1.1 to 1 (isocyanate to polyol) ratio based on reactive sites, i.e., NCO to OH functional groups. Some comparative examples lack one or more of the aforementioned components, as indicated in tables 1 and 2 below. The same types of urea and isocyanate component are used for all of the examples, and are described in further detail below.

A screening trial to measure dissolution rates of various encapsulated particles is conducted. The particles are placed in the bottom of a coarse-grade sintered glass funnel. Urea release is measured by washing 15 grams of the particles 5 times with 500 ml of cold tap water. The water is poured rapidly in the funnel corresponding to about 2 inches of rain for each rinse. The water is allowed to percolate through the encapsulated particles and at "its own rate" under the force of gravity, without applying any suction. Filtrate (or rinsate) is collected and placed in sample vials. The samples of rinsate are analyzed for urea content using standard analytical methods. Results for dissolution rates for each of the particles is indicated in tables 1-3 below.

TABLE 1

| Rinsate Number | Core Particle | Iso. Comp. at 2 wt. % | Comparative 1 at 2 wt. % | Comparative 1 at 4 wt. % |
| --- | --- | --- | --- | --- |
| 1 | 29.5 | 10.5 | 3.7 | 1.7 |
| 2 | 1.1 | 10.5 | 7.3 | 2.7 |
| 3 | 1.1 | 0.7 | 5.8 | 4 |
| 4 | 1 | 0.5 | 5.1 | 4.4 |
| 5 | 1.2 | 0.5 | 3.7 | 3.6 |

"Core Particle" are just particles of the urea without any coating. The same urea is used in all the examples herein and is a conventional grade urea, which is available from a variety of suppliers. As shown above and in FIG. 2, the urea (uncoated) essentially all eluted in the first rinse, which validates the method employed for determining dissolution rates of the particles.

"Iso. Comp." are particles of the urea with a 2 wt. % coating of the isocyanate component only. The isocyanate component is a polymeric methylene diphenyl diisocyanate (pMDI) with a functionality of approximately 2.7, an NCO content of 31.5, and a viscosity of 200 centipoise at 25° C. The isocyanate component is commercially available from BASF Corporation of Florham Park, N.J. under the trade name of LUPRANATE® M20S. The same isocyanate component is used in all the examples herein (but for Core Particle). As shown above and in FIG. 2, the urea quickly eluted in the first two rinses indicating that the isocyanate component alone does not provide adequate protection for the urea spheres.

"Comparative 1" (Comp. 1) are particles of the urea with a 2 and 4 wt. % coating of the isocyanate component and a polyol reaction product. The polyol is castor oil and has a hydroxyl number of 162 and a nominal functionality of 3. As shown above and in FIG. 3, dissolution rates of Comp. 1 can be appreciated.

TABLE 2

| Rinsate Number | Comparative 2 at 2 wt. % | Comparative 2 at 4 wt. % | Comparative 3 at 2 wt. % | Comparative 4 at 4 wt. % |
| --- | --- | --- | --- | --- |
| 1 | 0.6 | 15.3 | 9.5 | 18 |
| 2 | 5.5 | 9.4 | 9.6 | 10.4 |
| 3 | 5.4 | 2.9 | 7.5 | 1.4 |
| 4 | 1 | 1.7 | 2.6 | 0.7 |
| 5 | — | 0.9 | 2.6 | 6.5 |

"Comparative 2" (Comp. 2) are particles of the urea with a 2 and 4 wt. % coating of the isocyanate component and a polyol reaction product. The polyol is a glycerine-initiated, propoxylated polyol and has a hydroxyl number range of 388-408, a nominal functionality of 3, and a viscosity of 360 centipoise at 25° C. The polyol is commercially available from BASF Corporation under the trade name PLURACOL® GP430. As shown above and in FIG. 3, dissolution rates of Comp. 2 can be appreciated. The "–" indicates that data was not collected for the rinsate.

"Comparative 3" (Comp. 3) are particles of the urea with a 2 wt. % coating of the isocyanate component and a polyol reaction product. The polyol is a glycerine-initiated, propoxylated polyol and has a hydroxyl number range of 222-237, a nominal functionality of 3, and a viscosity of 270 centipoise at 25° C. The polyol is commercially available from BASF Corporation under the trade name PLURACOL® GP730. As shown above and in FIG. 3, dissolution rates of Comp. 3 can be appreciated.

"Comparative 4" (Comp. 4) are particles of the urea with a 4 wt. % coating of the isocyanate component and a polyol reaction product. The polyol is a polyol derived from an aromatic amine-based initiator including propylene oxide (PO) and ethylene oxide (EO) and has a hydroxyl number of 390, a nominal functionality of 4, and a viscosity of 10,500 centipoise at 25° C. The polyol is commercially available from BASF Corporation under the trade name PLURACOL® P824. As shown above and in FIG. 3, dissolution rates of Comp. 4 can be appreciated.

TABLE 3

| Rinsate Number | Inventive 1 at 2 wt. % | Inventive 1 at 2 wt. % | Inventive 1 at 4 wt. % | Inventive 2 at 2 wt. % | Inventive 2 at 4 wt. % |
|---|---|---|---|---|---|
| 1 | 3.7 | 3.6 | 3.8 | 7.9 | 15.8 |
| 2 | 5.4 | 5.4 | 4.7 | 5.2 | 11.4 |
| 3 | 5.6 | 5.2 | 4.7 | 4 | 15 |
| 4 | 6.6 | 4.7 | 4.3 | 1.8 | 0.7 |
| 5 | 4.6 | 4.4 | 18.3 | 2.4 | — |

"Inventive 1" (Inv. 1) are particles of the urea with a 2 and 4 wt. % coating of the isocyanate component and a polyol reaction product. The polyol is a graft polyol including castor oil as a continuous phase and SAN particles as polymeric particles. Two trials were run at 2 wt. % for reproducibility purposes. As shown above and in FIG. 4, dissolution rates of Inv. 1 can be appreciated.

"Inventive 2" (Inv. 2) are particles of the urea with a 2 and 4 wt. % coating of the isocyanate component and a polyol reaction product. The polyol is a secondary hydroxyl-terminated graft polyether triol having a hydroxyl number of 27-31, a nominal functionality of 3, and a viscosity of 4,340 centipoise at 25° C. The graft polyol includes 44 wt. % SAN particles as polymeric particles. The graft polyol is commercially available from BASF Corporation under the trade name PLURACOL® 4600. As shown above and in FIG. 4, dissolution rates of Inv. 2 can be appreciated. The "–" indicates that data was not collected for the rinsate.

Generally, the encapsulated particles of the present invention had more uniform dissolution rates relative to the comparative examples of particles. While some points may indicate fluctuations in dissolution rates of the inventive examples, it is believed that this is due to plugging in the filter which caused greatly extended contact time for each rinse, therefore increasing the amount of urea present in the respective rinsate. Further, the encapsulated particles of the present invention were generally more resilient to breakage relative to the comparative particles.

The present invention has been described herein in an illustrative manner, and it is to be understood that the terminology which has been used is intended to be in the nature of words of description rather than of limitation. Many modifications and variations of the present invention are possible in light of the above teachings. The invention may be practiced otherwise than as specifically described within the scope of the appended claims.

What is claimed is:
1. An encapsulated particle comprising:
   a core particle; and
   a polyurethane layer disposed about said core particle and comprising the reaction product of
      an isocyanate component, and
      an isocyanate-reactive component comprising a graft polyol having a continuous phase and polymeric particles selected from the group of styrene copolymer particles, polyurea particles, polyurethane particles, and combinations thereof.

2. An encapsulated particle as set forth in claim 1 wherein said graft polyol is a styrene acrylonitrile (SAN) polymer polyol.

3. An encapsulated particle as set forth in claim 2 wherein said polymeric particles comprise SAN copolymers.

4. An encapsulated particle as set forth in claim 3 wherein said polymeric particles are present in said isocyanate-reactive component in an amount of from about 5 to about 70 parts by weight based on 100 parts by weight of said isocyanate-reactive component.

5. An encapsulated particle as set forth in claim 4 wherein said polymeric particles have a weight ratio of styrene to acrylonitrile of from about 30:70 to about 70:30.

6. An encapsulated particle as set forth in claim 1 wherein said graft polyol is selected from the group of polyharnstoff (PHD) polyols, polyisocyanate polyaddition (PIPA) polyols, and combinations thereof.

7. An encapsulated particle as set forth in claim 1 wherein said isocyanate component is selected from the group of polymeric diphenylmethane diisocyanates (PMDI), diphenylmethane diisocyanates (MDI), and combinations thereof.

8. An encapsulated particle as set forth in claim 1 wherein said continuous phase comprises a polyol having at least two hydroxyl functional (OH) groups.

9. An encapsulated particle as set forth in claim 8 wherein said polyol is a hydrophobic polyol.

10. An encapsulated particle as set forth in claim 8 wherein said continuous phase comprises castor oil.

11. An encapsulated particle as set forth in claim 1 wherein said polyurethane layer is substantially free of water.

12. An encapsulated particle as set forth in claim 1 wherein said polyurethane layer is anhydrous.

13. An encapsulated particle as set forth in claim 1 wherein said polyurethane layer has an average thickness of from about 50 to about 200 microns.

14. An encapsulated particle as set forth in claim 1 wherein said polyurethane layer includes a concentration of said isocyanate-reactive component proximal to said core particle and a concentration of said isocyanate component distal to said core particle and adjacent to said concentration of said isocyanate-reactive component.

15. An encapsulated particle as set forth in claim 1 wherein said polyurethane layer includes a concentration of said isocyanate component proximal to said core particle and a concentration of said isocyanate-reactive component distal to said core particle and adjacent to said concentration of said isocyanate component.

16. An encapsulated particle as set forth in claim 1 wherein said core particle comprises a fertilizer.

17. An encapsulated particle as set forth in claim 16 wherein said fertilizer is selected from the group of nitrogen, phosphate, potash, sulfur, and combinations thereof.

18. An encapsulated particle comprising:
   a core particle comprising a fertilizer; and
   a polyurethane layer disposed about said core particle and comprising the reaction product of an isocyanate component selected from the group of polymeric diphenylmethane diisocyanates (PMDI), diphenylmethane diisocyanates (MDI), and combinations thereof, and an isocyanate-reactive component comprising a graft polyol having a continuous phase and polymeric particles selected from the group of styrene copolymer particles, polyurea particles, polyurethane particles, and combinations thereof, the continuous phase comprising a polyol having at least two hydroxyl functional (OH) groups.

19. An encapsulated particle as set forth in claim 18 wherein said graft polyol is selected from the group of styrene acrylonitrile (SAN) polymer polyols, polyharnstoff (PHD) polyols, polyisocyanate polyaddition (PIPA) polyols, and combinations thereof.

20. An encapsulated particle as set forth in claim 18 wherein said polyurethane layer is substantially free of water.

21. A method of forming an encapsulated particle, said method comprising the steps of:

providing a core particle;

applying an isocyanate component and an isocyanate-reactive component comprising a graft polyol having a continuous phase and polymeric particles selected from the group of styrene copolymer particles, polyurea particles, polyurethane particles, and combinations thereof to the core particle; and reacting the isocyanate component and the isocyanate-reactive component to form a polyurethane layer disposed about the core particle to form the encapsulated particle.

22. A method as set forth in claim 21 wherein said isocyanate-reactive component is applied to the core particle prior to applying the isocyanate component to the core particle.

23. A method as set forth in claim 21 wherein said isocyanate component is applied to the core particle prior to applying the isocyanate-reactive component to the core particle.

24. A method as set forth in claim 21 further comprising the step of blending the isocyanate component and the isocyanate-reactive component to form a mixture prior to said step of applying the isocyanate component and the isocyanate-reactive component to the core particle.

25. A method as set forth in claim 21 wherein the graft polyol is selected from the group of styrene acrylonitrile (SAN) polymer polyols, polyharnstoff (PHD) polyols, polyisocyanate polyaddition (PIPA) polyols, and combinations thereof.

26. A method as set forth in claim 21 wherein the core particle comprises a fertilizer.

* * * * *